Patented Oct. 23, 1928.

1,689,036

UNITED STATES PATENT OFFICE.

PAUL E. LEISS, OF YOUNGSTOWN, OHIO.

WATER SOFTENING.

No Drawing.   Application filed November 1, 1923.  Serial No. 672,224.

The present invention relates to water softening, and more particularly to the softening of water for boiler and analogous uses.

At the present time, it is customary to soften water on a commercial basis, by the so-called lime and soda ash method. It is well known that in employing this method, it is necessary to carefully weigh both the lime and the soda ash and also to add these ingredients at certain definite times with respect to the commencement of filling of the tank, the period of agitation and the time of completion. This requires separate lines for handling the ingredients and also requires extremely careful and accurate manipulation.

It is also often necessary, in connection with the lime and soda ash treatment, to use a coagulant, such as iron sulphate or aluminum sulphate, for the purpose of forming a flocculent precipitate. This tends to more quickly throw down any of the compounds formed during the treatment and also to precipitate or entrain some of the organic matter from the water. There is considerable objection to the use of such a coagulant for the reason that such a sulphate forms calcium sulphate in solution, which must, in turn, be removed by soda ash. The addition of soda ash for this purpose further increases the concentration of the soluble salts in the water.

By the lime and soda ash method, the water, after treatment, contains magnesium carbonate, calcium carbonate, silica, iron oxide, aluminum oxide, sodium hydroxide, sodium carbonate and sodium sulphate. The first five of these compounds are objectionable, for the reason that they tend to form scale or incrustations in the tubes or boilers through which they pass. The sodium compounds, in turn, are objectionable, for the reason that they are strongly alkaline, and for the further reason that in combination with organic matter they tend to produce objectionable foaming action.

It is appreciated that this method seldom, if ever, substantially decreases the concentration of the salts in solution in the water, and in most instances it actually effects an increase in the concentration thereof.

It has also been proposed to treat water by means of softeners operating to soften the water by reason of their base-exchanging properties, such for example, as the zeolite softeners. Due, however, to the cost of resupplying the desired sodium compounds after comparatively short periods of use, and the consequent inactivity of such softeners during such periods, their use has not been altogether satisfactory. In addition, such zeolite softeners do not effect any desirable decrease in the concentration of the salts held in solution in the water, and usually form water having a comparatively large percentage of soluble salts in solution therein.

It has also been proposed heretofore to treat water with barium carbonate in such manner that the solubility of the carbonate was determined and limited by the presence of sulphates in the water. This method has not been altogether satisfactory on account of the length of time required for treatment, due to the decreasing amount of sulphate in the water, and therefore the decreasing solubility of the barium carbonate. Further objections arise from the presence in the treated water of relatively large amounts of hardening constituents.

In accordance with the present invention, the objections and difficulties incident to systems of the character heretofore used are obviated, and there is provided a method which may easily be carried out without careful attention being paid either to the time factor or to the excess amount of the major portion of the ingredients supplied. Furthermore, in accordance with the present invention, the concentration of the salts held in solution in the water is materially decreased, and the objectionable compounds tending to produce foaming and scale are largely eliminated.

The present invention also provides a method of treating water which does not require the use of a coagulant such as required with the lime and sode ash method.

In accordance with my invention, I treat the water to be softened with a barium compound which will react with the calcium and/or magnesium sulphates to precipitate out the sulphates as barium sulphate. The barium compound preferably employed is barium carbonate. Lime, however, is preferably added to the barium carbonate in the presence of water to form some barium hydrate, and this mixture is then added to the water to be treated. Under some circumstances, a small amount of sodium chloride, or other suitable compound capable of increasing the solubility of the calcium hydroxide, may be added to still further lessen the time of reaction.

In my preferred process, the barium carbonate and lime were weighed out and mixed with water in a small mixing tank and then boiled. The calcium hydroxide, during this boiling, produced some barium hydroxide. After boiling, the water mixture of calcium hydroxide, barium hydroxide and barium carbonate was pumped into the large settling tank while the tank was being filled with raw river water. The settling tank was agitated for one hour and fifteen minutes after the tank was filled. The samples taken at intervals after the tank was filled showed that the reaction was substantially completed in less than one-half hour's time. After the agitation was stopped, the precipitates settled out very rapidly, the water being clear in a short time. The water temperature in the tanks was between 135° and 140° F. The process may be carried out at the ordinary water temperatures, although it is desired to have the water warm to shorten the time of reaction.

The amount of barium carbonate was determined by calculating the amount of barium carbonate theoretically necessary to combine with the sulphates in the water to form barium sulphate. A small excess of barium carbonate was added to the theoretical amount. The various tests indicated that the excess of barium carbonate apparently had no deleterious effect whatsoever. The amount of calcium hydroxide used was calculated to yield an excess of from one to two grains of calcium hydroxide per gallon after the water softening reaction had taken place.

A comparison of the analyses of the water after treatment shows a reduction in the concentration of the salts in solution of about seventy percent over the water treated by the soda ash method. There was also a reduction of over seventy-five percent of the incrusting salts left in the water over the soda ash method. The analyses show a marked decrease in the silica, the iron and aluminum compounds and the sodium compounds over the lime and soda ash method. The alkalinity of the water is greatly reduced as compared with the lime and soda ash method, and consequently there is less tendency to foaming and priming in the boilers.

The amounts of reagents added do not have to be as carefully figured as in the lime and soda ash method and the process is completed in a shorter time. The barium compounds precipitated have a considerably higher specific gravity than the precipitates formed in the lime and soda ash method and therefore settle out more quickly themselves, and also tend to carry down with them other solid matter so that the water becomes clear much more rapidly than in the lime and soda ash treatments.

Having described the practical application of the process together with typical examples of the amounts of reagents added and results obtained, I will next indicate what appear to me to be the theoretical reasons for the improved results obtained.

The barium from the barium compound added combines with the calcium and magnesium sulphates, which are the principal salts forming permanent hardness, to form barium sulphate, which is very insoluble. It has been found that the reaction between the barium carbonate and the incrusting salts in the water is considerably slower and much less complete than the reaction which takes place when the barium is in the presence of calcium hydroxide. Calcium hydroxide is therefore used with the barium carbonate, as it both hastens the reaction and insures a more complete elimination of the hardening constituents. As above described, under the practical application of the process, the barium carbonate and the calcium hydroxide are mixed together with water in a small mixing tank separate from the main treating tank, and boiled. This causes a reaction to take place between the barium carbonate and the calcium hydroxide, whereby some barium hydroxide is formed. The reaction which produces the barium hydroxide will take place in the cold, but takes place much more rapidly at higher temperatures.

The barium hydroxide is very much more soluble in water than calcium hydroxide and is a stronger base, and hence the reactions will proceed more rapidly and positively. Furthermore, the barium hydroxide will react with any free carbonic acid or bicarbonates in the water to form barium carbonate. Barium carbonate at the point of formation is, in effect, the same as being in solution, so that the reaction whereby the sulphates are removed by barium carbonate is practically instantaneous, in so far as that part of the barium carbonate is concerned which was in solution or at the point of formation. Some of the incrusting salts are somewhat soluble in the presence of the soluble salts left in the water by the ordinary lime and soda ash process, but are very insoluble in the presence of barium hydroxide. On the other hand, while barium carbonate is relatively insoluble in water, it is somewhat more soluble in the mixture containing barium hydroxide.

The barium sulphate is, as is well known, very insoluble in water. It is about twice as heavy as the precipitates formed by the usual soda ash method, and consequently, settles out quickly. It tends to carry down with it the other impurities, such as the iron, aluminum and organic compounds and clears the water rapidly. Moreover, a coagulant such as is usually employed in the soda ash process is not necessary with my barium process, although it may be used, if desired.

The barium carbonate and calcium hydroxide react with the magnesium salts to from magnesium hydroxide which is insoluble and settles out. They also react with the calcium salts present to form calcium carbonate which is also relatively insoluble and settles out.

It will be noted that the reaction products are all insoluble or very sparingly soluble in water, so that the concentration of the salts held in solution is greatly decreased as compared with the soda ash method.

The calcium hydroxide not only accelerates the reaction between the barium and the salts in the water, but also makes the temperature of the water a much less important factor than where barium carbonate alone is used. Also the actual excess amount of calcium hydroxide added is an important factor, not only in the rapidity of the action, but also in the completeness of the elimination, because by the production of some barium hydroxide, the reaction is not dependent on the solubility of the barium carbonate in a sulphate solution. In the typical examples cited above, where the water temperatures were between 135° and 140° F., an excess of calcium hydroxide of about 1.1 to 1.5 grains per gallon is employed. At the ordinary water temperatures, the excess of hydroxide should be increased to 1.7 to 2 grains per gallon. Without such excess amounts of the calcium hydroxide the separation of the magnesium as the hydroxide and the elimination of the calcium sulphate will not be completed within the time usually permissible for water treatment.

Tests have been made on the process at various temperatures from 45° F. to 150° F. At the lower temperatures the elimination of calcium and magnesium sulphates was complete, but there was very little effect on the sodium sulphate present. At the higher temperatures, the sodium sulphate may be eliminated. The reaction between sodium sulphate and barium carbonate forms sodium carbonate and as soon as the sodium carbonate forms, it reacts with the excess calcium hydroxide to form calcium carbonate and this effaces the value of such calcium hydroxide. The presence of sodium carbonate even in small quantities stops the reaction altogether. Therefore, if it is desired to completely eliminate sodium sulphate, the excess of calcium hydroxide should be high enough to counteract any sodium carbonate formed.

The analyses of the water as treated by my barium process, given above, show the presence of calcium hydroxide in the treated water. In the lime and soda ash method, the excess calcium hydroxide is eliminated by the reaction between it and the sodium carbonate added. This reaction also produces sodium hydroxide. There is also present an excess of the sodium carbonate. It is generally agreed that in the higher temperatures obtained in the boiler any excess of sodium carbonate is converted to the hydroxide. Assuming an excess of two grains of calcium hydroxide and two grains of sodium carbonate, per gallon, there would be produced in the boiled water about four grains of sodium hydroxide. This strong alkali at the higher temperatures in the boiler combines with any organic matter which may be present and forms a soap suds and consequently foaming. For this reason, I prefer to take the water as it is with the excess calcium hydroxide indicated by the analyses and use it as a boiler feed water without the addition of soda ash. Any calcium carbonate which may be formed from the hydroxide does not form a hard scale. Moreover, the calcium hydroxide and any barium hydroxide which may be present with it and which will behave similar to calcium hydroxide are not as strong bases as sodium hydroxide and therefore, cause less foaming.

If desired, soda ash may be added and will eliminate the excess of calcium hydroxide. Since all of the reactions in the water softening are time reactions and as sodium carbonate stops the reaction completely, it may be added at any time during the process, and thus arrest the further action of the barium carbonate, which may be left for the next tank to be treated. By the use of soda ash, the elimination of the salts may be accurately controlled and varied from the limit of maximum elimination. Ordinarily, however, it is preferred to allow the barium reactions to be as complete as possible, since the object is the maximum elimination of the incrusting salts.

The reduction in the incrusting salts in the feed water, as contrasted with the usual lime and soda ash method, is believed to be due to several reasons. First, the solubility of the incrusting salts is increased in the presence of the sodium sulphate produced in the soda ash process; second, there is a tendency to hold the silica in solution by the sodium hydroxide and carbonate present in the lime and soda ash process; third, my process causes a very effective elimination of the iron and aluminum compounds; fourth, while calcium and magnesium carbonates are somewhat soluble in water, and particularly in the presence of other salts in solution, as in the case of lime and soda ash process, they are relatively insoluble in the presence of barium hydroxide.

Under some circumstances, it is desirable to use sodium chloride, or some other suitable compound capable of increasing the solubility of the calcium hydroxide, with the barium carbonate and calcium hydroxide. In this case, such material should be boiled with the barium carbonate and lime. The reaction which takes place between the calcium hydroxide and the barium carbonate to form barium hydroxide is by no means complete, being limited by the solubility of the calcium hydroxide in the water. Practically, all of the calcium hydroxide which is in solution is converted into barium hydroxide, but calcium hydroxide is only sparingly soluble in pure water, being more soluble in cold than in hot water. However, if a relatively small amount of sodium chloride, or other material as set forth, is added to the calcium hydroxide and barium carbonate mixture before boiling it, the amount of calcium hydroxide which goes in solution can be materially increased. For example, a two percent sodium chloride solution nearly doubles the solubility of the calcium hydroxide. The two percent solution in the small mixing tank raises the concentration of the soluble salts in the water after treatment less than two grains per gallon. In cases where this is not objectionable and where it is desired to get a quicker reaction time, sodium chloride may be used with advantage, although for ordinary purposes, I have not found it necessary.

While I have given typical cases showing the application of my process in actual use and have endeavored to set forth the theoretical reasons which I believe underlie the process, it is to be understood that the invention is not limited to its preferred embodiments hereinbefore described or to the theoretical explanation, but may be embodied in various processes of softening water within the scope of the following claims.

An important advantage of the present invention arises from the pre-mixing of the barium carbonate and the calcium hydroxide before introduction into the water to be treated. This pre-mixing produces sufficient barium hydroxide to make the reaction independent of the solubility of barium carbonate in a sulphate solution. This insures a quicker and more complete reaction, and consequent more complete elimination of the hardening constituents than can be obtained by the separate addition of the ingredients, such as takes place by the addition of lime to the water and subsequent addition of the barium carbonate.

The term "barium compound" as used in the following claims shall be understood to include barium carbonate, barium hydroxide, or both.

I claim:

1. The process of softening water, comprising mixing barium carbonate and calcium hydroxide with water, and thereafter adding the mixture to the water to be softened, substantially as described.

2. The process of softening water, comprising boiling barium carbonate and calcium hydroxide, and thereafter adding the mixture to the water to be softened, substantially as described.

3. The process of softening water, comprising causing a reaction between barium carbonate and calcium hydroxide, and thereafter producing a reaction between the mixture so formed and the incrusting salts in the water to be softened, substantially as described.

4. The process of softening water, comprising adding to the water to be softened barium carbonate, and calcium hydroxide, and increasing the solubility of the calcium hydroxide, substantially as described.

5. The process of softening water, comprising mixing barium carbonate, calcium hydroxide and a salt capable of increasing the solubility of calcium hydroxide with water, and thereafter adding the mixture to the water to be softened, substantially as described.

6. The process of softening water, comprising treating the water with a barium compound which will precipitate the calcium and magnesium sulphates, and arresting the reaction when desired by the addition of sodium carbonate, substantially as described.

7. The process of softening water, comprising adding barium carbonate and calcium hydroxide to the water to be softened whereby the incrusting salts are precipitated, and arresting the water-softening reaction when desired by the addition of sodium carbonate, substantially as described.

8. The process of softening water, comprising the steps of converting calcium and magnesium sulphates into barium sulphate by the addition to the water of a mixture of barium carbonate and calcium hydroxide, substantially as described.

9. The process of softening water, comprising adding to the water a compound or compounds containing barium together with a hydroxide and causing a precipitation of sulphates as barium sulphate and magnesium as magnesium hydroxide substantially as described.

10. The process of softening water, comprising adding to the water to be softened a mixture comprising barium and a hydroxide, and thereafter adding a carbonate, substantially as described.

11. The process of softening water, comprising heating barium carbonate and calcium hydroxide in water, and thereafter adding the mixture to the water to be softened, substantially as described.

12. The process of softening water, comprising causing a reaction between barium carbonate and calcium hydroxide, and thereafter producing a reaction between the barium hydroxide so formed and the incrusting salts in the water to be softened, substantially as described.

13. The method of treating water, comprising making a mixture of barium carbonate with an hydroxide, increasing the temperature of the mixture to hasten the production of barium hydroxide, and then adding the barium hydroxide to the water to be treated, substantially as described.

In testimony whereof I have hereunto set my hand.

PAUL E. LEISS.